June 21, 1960   L. M. FORBUSH ET AL   2,941,614
FLUID PRESSURE OPERATED VEHICLE DOOR LOCK
Filed May 12, 1958                     2 Sheets-Sheet 1
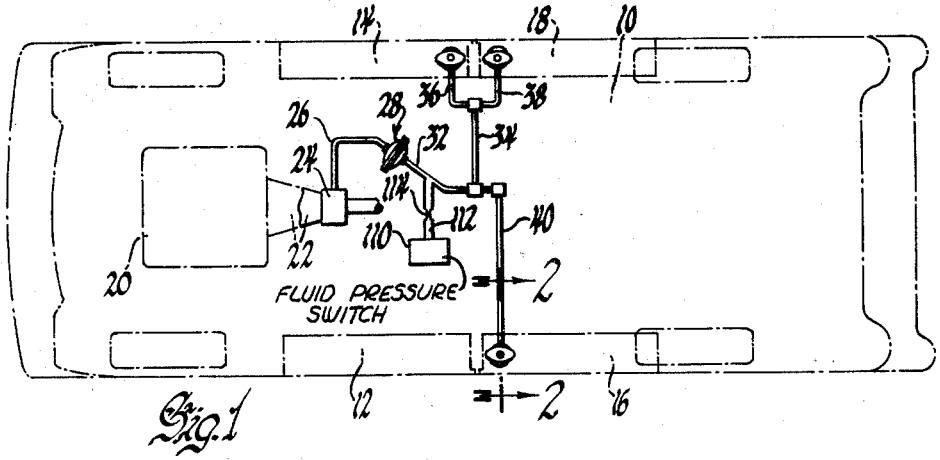
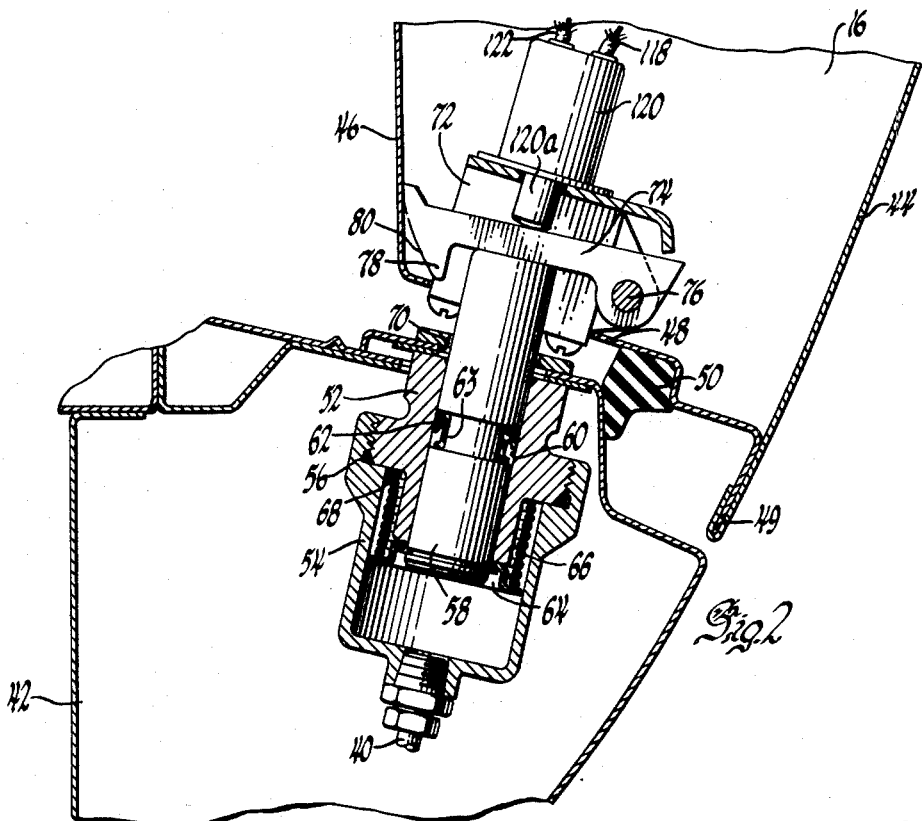
INVENTORS
Lothrop M. Forbush,
BY James H. Stone &
Walter H. Zimmerman
W. S. Pettigrew
ATTORNEY June 21, 1960  L. M. FORBUSH ET AL  2,941,614
FLUID PRESSURE OPERATED VEHICLE DOOR LOCK Filed May 12, 1958  2 Sheets-Sheet 2

INVENTORS
Lothrop M. Forbush,
BY James H. Stone &
Walter H. Zimmerman
W. J. Pettigrew
ATTORNEY

United States Patent Office 2,941,614
Patented June 21, 1960

2,941,614

FLUID PRESSURE OPERATED VEHICLE DOOR LOCK

Lothrop M. Forbush and James H. Stone, Birmingham, and Walter H. Zimmerman, Royal Oak, Mich., assignors to General Motors Corporation, Detroit, Mich., a corporation of Delaware Filed May 12, 1958, Ser. No. 734,481

11 Claims. (Cl. 180—82)

This invention relates to a safety door lock, and more particularly to a safety door lock for a vehicle which is operated by fluid pressure generated as a function of movement of the vehicle.

One feature of the invention is that it provides an improved safety door lock; another feature of the invention is that it provides a novel hydraulic safety door lock including an hydraulically driven bolt mounted in the rocker panel of an automobile and adapted to be projected into engagement with a striker in the door by fluid pressure generated as a function of movement of the automobile; still another feature of the invention is that the bolt forms a piston in the hydraulic circuit; yet a further feature of the invention is that the system includes a first hydraulic circuit which is part of the automobile transmission and a second closed hydraulic circuit adapted to be actuated by pressure in the first circuit through a diaphragm; yet a further feature of the invention is that it provides a novel system for indicating that the safety lock is functioning, including a time delay for providing a brief indication that the hydraulic system and the safety latch are operating.

Other features and advantages of the invention will be apparent from the following description and from the drawings, in which:

Fig. 1 is a schematic view of the safety lock arrangement in an automobile, which is shown in bottom plan in broken lines;

Fig. 2 is an enlarged vertical transverse section through a portion of one rocker panel and one door of the automobile of Fig. 1, showing the lock parts for that door;

Figure 3:
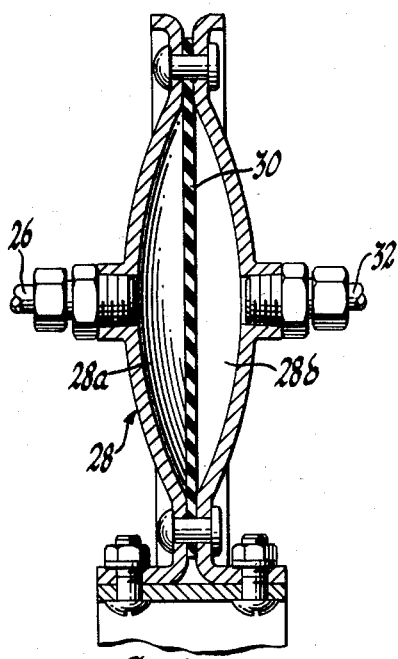
Fig. 3 is an enlarged section through the diaphragm which interconnects the fluid circuits of the system.

The locking system is designed to be used as a subsidiary safety lock for the doors of an automobile and may be used in conjunction with conventional manually operated primary locks as shown in the patent to Leslie No. 2,976,276, entitled "Rotary Bolt Door Latch." A primary lock similar to that shown in the Leslie patent or of any other construction may be used on each of the automobile doors and the subject subsidiary safety locking arrangement may be used on any or all the doors, preferably being used on all except the driver's door. The novel locking arrangement is particularly advantageous when used on a door that is hinged at its rear edge. If a door of this type is inadvertently opened when the car is in motion, it swings into the wind and may be pulled violently by air pressure to a fully open position. If the car is traveling fast, the hinge structure may be damaged and there is some likelihood that the operator who inadvertently opened the door will be pulled out of the automobile. This improved safety lock arrangement is designed so that it operates automatically, the bolt being projected by fluid pressure which is generated as a function of movement of the automobile. Consequently, whenever the automobile is in motion, the safety lock operates to prevent inadvertent opening of a door. The lock system includes a novel signal system which provides a short indication that the hydraulic system is operating, the signal system being arranged so that it does not provide a constant signal which might distract the attention of the driver.

Referring now more particularly to the drawings, Fig. 1 shows a schematic arrangement of the safety lock system mounted in an automobile having a body 10, a driver's front door 12, a passenger's front door 14, a left rear door 16, and a right rear door 18. Each front door is hingedly mounted on the body at the front edge of the door and each rear door is hingedly mounted on the body at the rear edge of the door. The engine is schown schematically at 20, the transmission at 22 and the rear pump of the transmission at 24. The rear pump 24 may be of the conventional type commercially used with automatic transmissions, being driven by the transmission output shaft whenever the car is in motion. A suitable pump arrangement is shown in Frank Patent 2,645,135 entitled "Transmission and Control." The safety lock system is operated by fluid pressure generated by the pump 24 so that the bolt in each safety door lock is projected by fluid pressure generated as a function of movement of the automobile.

The pump 24 communicates through a fluid conduit 26 with a chamber 28a in one side of a diaphragm housing 28 which is shown in detail in Fig. 3. Within the housing 28 is mounted a flexible diaphragm 30 which seals off one side of the housing from the other to provide separate chambers 28a and 28b. Oil from the transmission system is pumped under pressure into the diaphragm chamber 28a whenever the car is in motion. The pump 24, conduit 26 and chamber 28a comprise a first fluid circuit. A second closed fluid circuit is provided on the other side of the diaphragm 30 and includes the diaphragm chamber 28b, hydraulic cylinders associated with the safety door locks and conduits through which the chamber 28b communicates with the cylinders. A fluid conduit 32 is connected to the chamber 28b and from the conduit 32 a stud conduit 34 feeds the safety door locks on the right side of the car, branching into a front door conduit 36 and a rear door conduit 38. The left rear door safety lock is fed by a conduit 40 which connects with the conduit 32.

Fig. 2 shows the details of the safety lock for the left rear door. The locks for the right rear door and the right front door are not shown in detail since they may be identical with the lock in the left rear door. Preferably the driver's door does not have a safety lock, although one may be provided if so desired.

Referring to Fig. 2, the body rocker panel of the automobile is shown at 42 and the lower portion of the left rear door is shown at 16, this door having an outer panel 44 and an inner panel 46 which is bent generally horizontally across the bottom edge of the door as illustrated at 48 to form the lower jamb face of the door. The panel 44 is joined to the panel 46 along the lower outer edge of the door by a pinch weld flange 49. A weather strip 50 seals the lower jamb face against the upper surface of the rocker panel 42.

Within the rocker panel is mounted an hydraulic cylinder comprising an upper boss portion 52 which is clamped in an opening 70 in the rocker panel and a lower hollow chamber portion 54 threaded onto the boss and sealed by a sealing ring 56. At its bottom end the chamber portion of the cylinder is connected to the conduit 40 which extends via the conduit 32 to the diaphragm chamber 28a. A bolt 58 is formed as a piston slidably mounted in a bore 60 in the boss portion of the cylinder, being sealed by a ring 62 which seats in a groove 63 formed in the bolt. On the lower end of the bolt a collar 64 is mounted and a compression spring 66 surrounds the lower portion of the bolt and seats between this collar and a shoulder 68 on the boss 52 to urge the bolt toward retracted position wherein the bottom of the bolt seats against the bottom of the cylinder chamber 54.

The bolt, when projected, extends through the opening 70 formed in the upper surface of the rocker panel into a striker mounted in the door 16. The striker comprises a hollow housing 72 bolted to the lower jamb face of the door and extending up into the door through an opening in the lower face thereof. A striker member 74 is pivotally mounted on a pin 76 on the striker housing, the striker member having a striker tooth 78 adapted to engage the projected bolt if the door starts to open. As shown in Fig. 2, clearance deliberately is left between the bolt and the striker tooth to prevent the necessity of providing close tolerances when mounting the lock and striker parts on the door and body and when mounting the door on the body. The inner end of the striker member 74 is formed as a cam surface 80 for camming engagement with the bolt in the event the door is closed while the bolt is projected so that the striker can be cammed out of the way and permit the door to close.

The operation of the mechanical portion of the system is as follows: When the automobile is stationary, the pump 24 is not operating and there is no fluid pressure in the first fluid circuit which contains transmission oil. Consequently, the bolt is retracted by the spring 66 from the position of Fig. 2 down to a position where its upper end is substantially flush with the upper face of the boss 52 and the door may be closed. When the automobile starts to move, the pump 24 is operated as is well understood in the art and is explained in detail in Frank Patent 2,645,135, generating fluid pressure in the first fluid circuit as a function of the movement of the automobile. This pressure is exerted against the left face (Fig. 3) of the diaphragm 30 to distort the diaphragm and develop a corresponding pressure in the closed second fluid circuit, which may be filled with automobile brake fluid. This fluid pressure projects the bolt. In the event the door is not closed when the automobile starts to move but is closed after the bolt has been projected, the cam surface 80 of the striker member engages the bolt and cams the striker member over the bolt. So long as the automobile continues in motion, the bolt is projected and similarly the bolts in the doors 14 and 18 are projected so that all doors except the driver's are locked positively against inadvertent opening. When the automobile ceases to move, the pump 24 ceases to operate and the spring 66 retracts the bolt.

Figure 4:
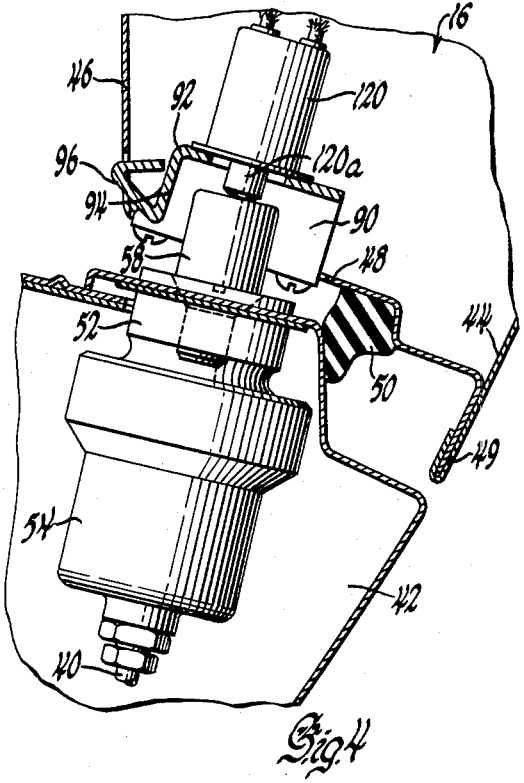
Fig. 4 is a view showing a modified form of striker.

Fig. 4 shows a modified form of the invention in which the striker is not pivoted but is fixedly mounted on the door. In this embodiment of the invention the rocker panel 42 houses an hydraulic cylinder comprising a boss portion 52 clamped to the rocker panel and mounting a hollow cylinder portion 54 which is connected by the conduit 40 in the closed second fluid circuit. The bolt 58 is formed as a piston slidably mounted in the hydraulic system in the same manner as the embodiment of Fig. 2. The striker however is fixedly mounted on the door rather than being pivoted thereon. In this embodiment the striker comprises a housing 90 bolted to the lower jamb face of the door and having a rigid striker member 92 formed with a striker tooth 94 having its leading edge bent up to form a cam surface 96. In the event the door is slammed shut after the bolt has been projected, the cam face 96 on the striker 92 contacting the bolt 58 causes a pressure build-up in the closed second fluid circuit which exceeds the pressure in the first fluid circuit and causes the diaphragm 30 to deflect against the first fluid circuit, allowing the bolt 58 to be pushed down into the cylinder 54 thus permitting the door to close. After the door is closed, the bolt again is moved up in the locked position as before. This requires only about one-quarter inch of movement of the bolt as compared with almost three-quarters of an inch of movement of the bolt between retracted and projected positions.

Figure 5:
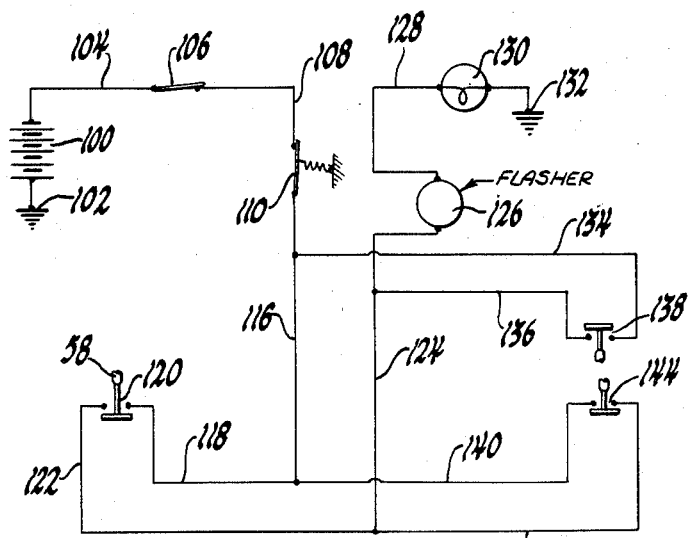
Fig. 5 is an electric circuit diagram of the signaling system.

Fig. 5 is a schematic diagram of a novel signal system incorporated in this safety door lock. A battery 100, which may be the usual battery which furnishes electrical power in the automobile, has one side connected to ground at 102 and the other side connected by a lead 104 to the automobile ignition switch 106. The other side of the ignition switch is connected by a lead 108 to a normally open pressure operated switch 110. Referring for a moment to Fig. 1, the switch 110 is shown connected to the conduit 32 by means of a conduit 112 having a restricted portion 114 providing a restricted orifice which creates a time delay in the operation of the pressure switch 110. As shown in Fig. 5 the other side of the fluid pressure operated switch is connected to a parallel arrangement of normally closed lock operated switches, one in each of the doors 14, 16 and 18. Leads 116 and 118 connect the pressure operated switch 110 to one side of a switch 120 (see also Figs. 2 and 4) in the door 16. The other side of this switch is connected by a lead 122 to a lead 124 which is connected to a conventional flasher device 126, the other side of which is connected by a lead 128 to an indicator lamp 130. The other terminal of the lamp is grounded at 132.

Similarly, leads 134 and 136 connect a lock operated switch 138 which is mounted in the door 14 in parallel with the switch 120 and leads 140 and 142 connect a lock operated switch 144 which is mounted in the door 18 in parallel with the switch 120. The switches 120, 138 and 144 are all similar and are adapted to be operated in the manner shown in Fig. 2 with regard to the switch 120. The switch 120 normally is closed, being spring biased in known manner to closed position. When the bolt is projected, it pivots the striker member 74 up into engagement with the switch plunger 120a, causing the switch to open. In the modification of Fig. 4, the operation is similar except that the bolt 58 itself engages the switch plunger 120a.

Assuming the ignition switch 106 to be closed and the car to be in motion, the circuit conditions are as illustrated in Fig. 5. Fluid pressure generated by the pump 24 will close the normally open pressure operated switch 110, although this switch, because of the restriction 114 in the conduit 112, will not close instantaneously when the car starts in motion. As soon as the car starts in motion, fluid pressure will cause the bolt in each lock to be projected so that each of the lock operated switches 120, 138 and 144 is opened. By virtue of this arrangement, there will be no indication from the lamp 130. When the car was stationary, the switch 110 was open, thus breaking the circuit to the indicator 130, even though the lock operated switches 120, 138 and 144 were closed. Since there is no time delay in the operation of the lock operated switches 120, 138 and 144, all these switches were opened immediately upon the generation of fluid pressure as a function of movement of the automobile so that the circuit to the indicator lamp 130 was maintained open even after the pressure operated switch 110 closed after a short time delay. Consequently there is no distracting indication to annoy the driver unless the safety locks are not operating properly.

When the automobile stops, switches 120, 138 and 144 immediately are closed as each respective lock bolt is retracted by its spring upon loss of pressure from the pump 24. The lamp 130 flashes intermittently for a few seconds until the time-delayed pressure operated switch 110 opens as fluid pressure is slowly released through the restricted portion 114 of the conduit 112. Thus, each time the automobile stops, the operator is given a brief indication that the hydraulic safety lock is in operating condition, but no constant annoying indication is given as the car is being driven. Of course, should there be some failure in the system so that any one of the bolt operated switches 120, 138 or 144 is not opened when the car is in motion, the indicating lamp 130 will flash. Preferably, this lamp may be mounted on the dashboard or in some other location where it is easily seen by the driver.

While we have shown and described two embodiments of our invention, it is capable of many modifications. Changes, therefore, in the construction and arrangement may be made without departing from the spirit and scope of the invention as set forth in the appended claims.

What is claimed is:

1. In combination in an automobile, a body having a door swingably mounted thereon, a first fluid circuit having a pump providing a source of fluid pressure in response to movement of the automobile, a housing having mounted therein a diaphragm and having a chamber on one side of said diaphragm communicating with said pump in said first fluid circuit, a second fluid circuit comprising a cylinder mounted on the body adjacent an edge of the door and communicating with a chamber on the other side of said diaphragm, a bolt formed as a piston slidably mounted in said cylinder and adapted to be projected toward said door by fluid pressure, and a striker on the door adapted to be engaged by the bolt when the door is closed and the bolt is projected by fluid pressure generated as a function of movement of the automobile.

2. Apparatus of the character claimed in claim 1, wherein said striker is pivoted on said door and has a cam surface adapted to engage the bolt when the door is closed while the bolt is projected, the striker pivoting to permit the door to be closed.

3. In combination in an automobile, a body having a door swingably mounted thereon, an engine, a transmission drivingly connected to said engine and including a first fluid circuit having a pump providing a source of fluid pressure in response to movement of the automobile, a housing having mounted therein a diaphragm and having a chamber on one side of said diaphragm communicating with said pump in said first fluid circuit, a second fluid circuit comprising a cylinder mounted on the body adjacent an edge of the door and communicating with a chamber on the other side of said diaphragm, a bolt formed as a piston slidably mounted in said cylinder and adapted to be projected toward said door by fluid pressure, spring means connected to the bolt in the cylinder for retracting the bolt, and a striker on the door adapted to be engaged by the bolt when the door is closed and the bolt is projected by fluid pressure generated as a function of movement of the automobile.

4. In an automobile having a body with a door swingably mounted thereon and having a first fluid circuit with a pump providing a source of fluid pressure in response to movement of the automobile, a safety door lock system of the character described, including: a housing having mounted therein a diaphragm and having a chamber on one side of said diaphragm communicating with said pump in said first fluid circuit, a second fluid circuit comprising a cylinder mounted on the body adjacent an edge of the door and communicating with a chamber on the other side of said diaphragm, a bolt formed as a piston slidably mounted in said cylinder and adapted to be projected toward said door by fluid pressure, and a striker on the door adapted to be engaged by the bolt when the door is closed and the bolt is projected by fluid pressure generated as a function of movement of the automobile.

5. In combination in an automobile, a body having a door swingably mounted thereon, an engine, a transmission drivingly connected to said engine and including a first fluid circuit having a pump providing a source of fluid pressure in response to movement of the automobile, a housing having mounted therein a diaphragm and having a chamber on one side of said diaphragm communicating with said pump in said first fluid circuit, a second fluid circuit comprising a cylinder mounted on the body adjacent an edge of the door and communicating with a chamber on the other side of said diaphragm, a bolt formed as a piston slidably mounted in said cylinder and adapted to be projected toward said door by fluid pressure, spring means connected to the bolt in the cylinder for retracting the bolt, a striker on the door adapted to be engaged by the bolt when the door is closed and the bolt is projected by fluid pressure generated as a function of movement of the automobile, and a signal system including an indicator device for indicating that the bolt has not been projected when the automobile is in motion.

6. In combination in an automobile, a door lock having a bolt operable as a function of movement of the automobile, and a signal system comprising an indicator, a source of voltage, a switch operated by movement of the bolt, a normally open pressure-operated switch which is independent of the bolt, an electric circuit interconnecting said source of voltage, indicator and switches, and means providing a time delay in the operation of said pressure-operated switch, whereby said circuit is held open by said pressure-operated switch until after said bolt operates.

7. In combination in an automobile having a door lock including a bolt and means to project the bolt by fluid pressure generated as a function of movement of the automobile, a signal system comprising an indicator, a source of voltage, a switch operated by movement of the bolt, a normally open fluid pressure operated switch which is independent of the bolt, an electric circuit interconnecting said source of voltage, indicator and switches, means connecting said pressure operated switch to the fluid pressure supply, and means in said connecting means providing a time delay in the operation of said pressure operated switch.

8. In combination in an automobile, a body having a door swingably mounted thereon, a first fluid circuit having a pump providing a source of fluid pressure in response to movement of the automobile, a housing having mounted therein a diaphragm and having a chamber on one side of said diaphragm communicating with said pump in said first fluid circuit, a second fluid circuit comprising a cylinder mounted on the body adjacent an edge of the door and communicating with a chamber on the other side of said diaphragm, a bolt formed as a piston slidably mounted in said cylinder and adapted to be projected toward said door by fluid pressure, a striker on the door adapted to be engaged by the bolt when the door is closed and the bolt is projected by fluid pressure generated as a function of movement of the automobile, a signal system comprising an indicator, a source of voltage, a lock operated switch, a fluid pressure operated switch, an electric circuit interconnecting said source of voltage, indicator and switches, means connecting said pressure operated switch in one of said fluid circuits, and means providing a time delay in the operation of said pressure operated switch.

9. Apparatus of the character claimed in claim 8, wherein the means connecting the pressure operated switch in one of the fluid circuits comprises a conduit having a restriction therein providing a time delay in the operation of said pressure operated switch.

10. Apparatus of the character claimed in claim 8, wherein said striker is pivoted on said door and has a cam surface adapted to engage the bolt when the door is closed while the bolt is projected, the striker pivoting to permit the door to be closed.

11. In combination in an automobile, a body having a door swingably mounted thereon, an engine, a transmission drivingly connected to said engine and including a first fluid circuit having a pump providing a source of fluid pressure in response to movement of the automobile, a housing having mounted therein a diaphragm and having a chamber on one side of said diaphragm communicating with said pump in said first fluid circuit, a second fluid circuit comprising a cylinder mounted on the body adjacent an edge of the door and communicating with a chamber on the other side of said diaphragm, a bolt formed as a piston slidably mounted in said cylinder and adapted to be projected toward said door by fluid pressure, spring means connected to the bolt in the cylinder for retracting the bolt, a striker on the door adapted to be engaged by the bolt when the door is closed and the bolt is projected by fluid pressure generated as a function of movement of the automobile, and a signal system comprising an indicator, a source of voltage, a normally closed lock operated switch in the door, a normally open fluid pressure operated switch, an electric circuit interconnecting said source of voltage, indicator and switches, and a conduit connecting said fluid pressure operated switch in one of said fluid circuits, said conduit having a restriction thereon providing a time delay in the operation of said fluid pressure operated switch.

References Cited in the file of this patent

UNITED STATES PATENTS

| | | |
|---|---|---|
| 2,110,125 | Galloway | Mar. 8, 1938 |
| 2,314,815 | Brandt | Mar. 23, 1943 |
| 2,848,057 | Forster | Aug. 19, 1958 |